J. F. BENNETT.
Apparatus for Forcing Liquors.
No. 6,639.
Reissued Sept. 14, 1875.
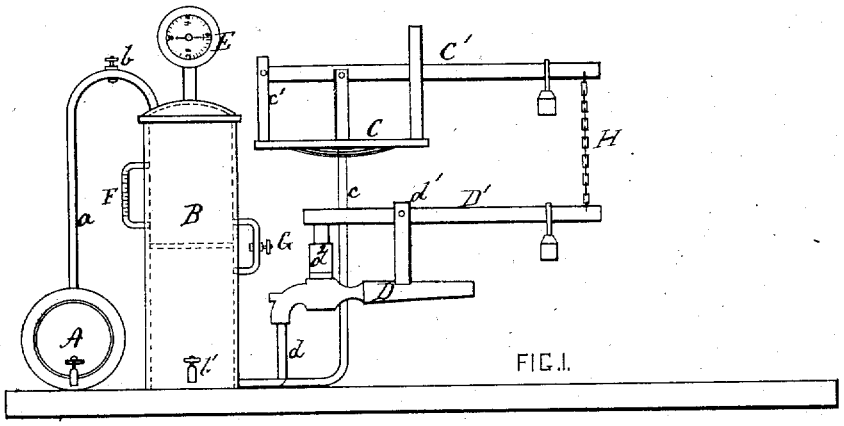
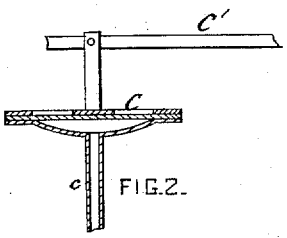
WITNESSES.
James L. Kay
R. C. Blanchard
INVENTOR.
John F. Bennett
by Bakewell & Kerr
Atty's

UNITED STATES PATENT OFFICE.

JOHN F. BENNETT, OF PITTSBURG, PENNSYLVANIA.

IMPROVEMENT IN APPARATUS FOR FORCING LIQUORS.

Specification forming part of Letters Patent No. 126,010, dated April 23, 1872; antedated April 13, 1872; reissue No. 6,639, dated September 14, 1875; application filed August 2, 1875.

*To all whom it may concern:*

Be it known that I, JOHN F. BENNETT, of Pittsburg, in the county of Allegheny and State of Pennsylvania, have invented a new and useful Improvement in Apparatus for Forcing Liquids; and I do hereby declare the following to be a full, clear, and exact description thereof, reference being had to the accompanying drawing forming a part of this specification, in which—

Figure 1 is an elevation of an apparatus illustrating my invention. Fig. 2 is a section of a diaphragm water-valve or pressure-regulator.

Like letters refer to like parts wherever they occur.

My invention relates to the manner of and apparatus for regulating the pressure upon liquids on draft; and it consists in the application of a constant, equable, unvarying pressure of air on the liquor during the whole time of the drawing, thus preventing the gases that are confined in the liquor, in the lees or sediment which settles on the bottom of the cask, from escaping, and which, in escaping, lift up with them part of the lees or sediment, and make the drawn liquor muddy in appearance, yeasty to the taste, and unwholesome to the stomach.

Hitherto, when an air-pump has been used to force ale, the action of the pump has been irregular—that is to say, suppose the pressure of the carbonic-acid gas in the ale of a full barrel to be twenty pounds per square inch, and the pressure of air induced by the pump to be the same, then, after drawing part of the ale, the pressure of the gas in the ale is decreased, and the pressure of the air induced by the pump is also decreased. When this decrease is taking place or occurring a part of the carbonic-acid gas rises out of the ale, and that part of the carbonic-acid gas which is in the ale in the lees or sediment on the bottom of the barrel, and which rises, lifts up with it mechanically some of the lees, rendering the ale muddy and unwholesome. Next, when the pump is again operated to restore the necessary pressure, air is forced into the ale, which again disturbs the lees and increases the evil. Thus the recurring irregular action of the pump is a churning up of the ale and lees or sediment, and injurious to the quality of the ale.

My improvement obviates this continual disturbance, and is new, inasmuch as it supplies a constant, equable, unvarying pressure of air on the surface of the ale during the whole time of the drawing off.

In the drawing referred to, A indicates an ale-barrel, connected by means of a suitable pipe, *a*, with a reservoir, B, which contains compressed air. In the length of connecting-pipe *a* is a tap or cock, *b*, for admitting or shutting off the compressed air at pleasure, or when the reservoir is to be replenished. B is a reservoir or chamber, provided with a pressure-gage, E, for indicating the pressure of the air in chamber B, and a glass tube or water-gage, *f*, for indicating the height of liquids, and when the chamber B is divided by a diaphragm, as shown in dotted line, Fig. 1, the compartments may be connected by a pipe, provided with a cock, G, for transferring to the lower chamber any liquids which may collect in the upper. The reservoir or chamber B is provided with a draw-off pipe, *b'*, to permit the escape of fluids, and is connected by means of a pipe, *d*, with a hydrant, D, or other suitable water-head, whereby pressure may be obtained. C is an elastic diaphragm or water-valve, one surface of which is connected by a pipe, *c*, with the pressure-reservoir B, or with the pipe *d* of the water-head, so as to be affected by any increase or diminution of pressure in A or B. The opposite surface of diaphragm C is connected to a weighted lever, C', having its fulcrum at *c'*, said lever being connected by a link, H, with a second weighted lever, D', the latter having its fulcrum at $d^1$, and operating a valve, $d^2$, which turns on and off the head of water.

The apparatus being thus arranged the pipe *d* is supplied with water from a head high enough to give pressure equal to or greater than the pressure required in A and B. The water, entering cylinder B through induction-pipe *d*, compresses the air, and when the tap *b* is open the compressed air presses on the surface of the ale, and keeps the gases confined. The air also acts on the gage E, and indicates the weight to be put on the lever of the water-diaphragm. For instance, if twenty pounds is the desired pressure, then when the pressure in B has reached twenty pounds, as indicated by the gage E, the diaphragm C will be weighted to that extent, so that when the pressure in A or B rises above the desired pressure the pressure will be transmitted through pipe C to the diaphragm, lifting the same, and through C′, H, and D′ turn off the water until such a time as the pressure in A B diminishes, when the fall of diaphragm C, levers C′ and D′ will operate the valve in the pipe *d* D, and restore the pressure.

The air-receiver may be made of any material that will resist the pressure—wood, iron, copper, &c.—and ought to be at least large enough to require emptying only once a day. It may have attached to it an automatic apparatus, by which the closing of the tap *b* between the ale-barrel and the air-reservoir, and the emptying of the water out of the air-reservoir, and the renewal of the operation, can be effected by the rise and fall of the water in the air-reservoir.

Having thus described my improvement, I claim as my invention—

1. In combination with a barrel or similar receptacle for containing liquid on draft, a reservoir for compressed air to exert aeriform pressure upon the liquid, and an automatic device to regulate and render uniform the pressure of the aeriform body upon the liquid in the barrel, substantially as specified.

2. The combination of the tank B, (divided or undivided,) pressure-valve C, and hydrant or pipe D, when combined to act substantially as set forth.

In witness whereof I, the said JOHN F. BENNETT, have hereunto set my hand.

JOHN F. BENNETT.

Witnesses:

JAMES I. KAY,

SAML. MCMASTERS.